Patented Mar. 10, 1942

2,275,945

UNITED STATES PATENT OFFICE 2,275,945

TILTING PLATFORM FOR THE UNLOADING OF TRUCKS AND OTHER VEHICLES

Manuel Castilla y Ruiz, Habana, Cuba

Application May 21, 1940, Serial No. 336,451
In Cuba July 22, 1939

5 Claims. (Cl. 214—49)

This invention relates to tilting platforms for unloading of trucks and other vehicles used in carrying heavy loads and the principal object of which is to provide simple means as well as easy and efficient operation for the unloading of such vehicles, the invention being preferably applied to the discharge of trucks loaded with sugar cane, onto the cane conveyers to the mills.

Figure 1:
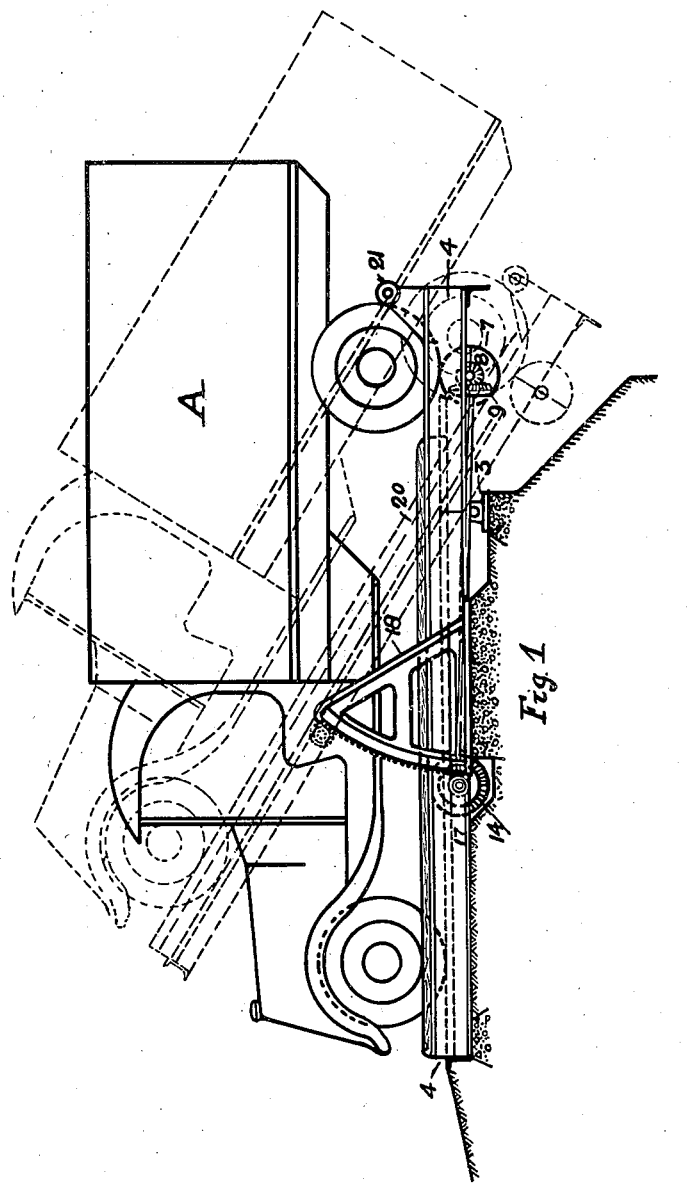
Figure 1 is a side elevation showing one installation of the tilting platform embodying the present invention.
Figure 2:
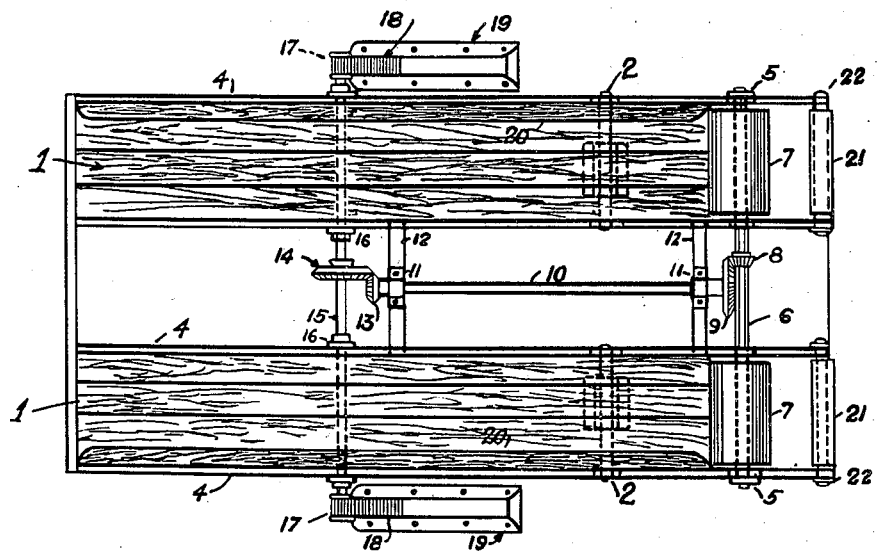
Figure 2 is an upper plan view thereof.
Figure 3:
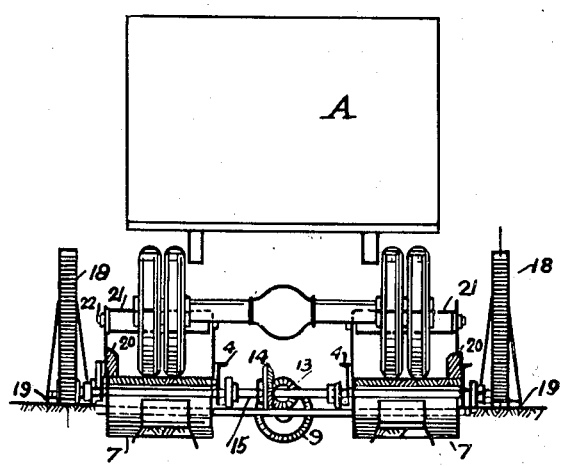
Figure 3 is a front elevation of the said installation.

1 represents a frame or platform consisting of two horizontal oscillating supporting plates placed at a certain distance from each other, and each of the plates is secured to a horizontal rotating shaft 2 between journal bearings 3 secured on concrete foundations for that purpose under the corresponding plate 1 towards the discharging rear part or end thereof.

Side beams 4 of the frame 1 extend beyond the rear end of the plates 1. A horizontal rotating shaft 6 is mounted in journal bearings 5 on these protruding ends. A pair of rollers 7 are secured on each end of said shaft, and between these rollers and on said shaft 6 a pinion 8 is fastened to which is geared a beveled wheel 9 secured on a horizontal shaft 10. The shaft 10 is longitudinally arranged with respect to the plates 1 and mounted to rotate in bearings 11 secured to crossbars 12 fastened between the said plates.

On the opposite end of shaft 10 a pinion 13 is secured, it being geared at right angles to a gear 14 fastened on a horizontal rotating shaft 15 between journal bearings 16 placed under the plates 1. On the ends of shaft 15 are secured pinions 17 geared to toothed sectors 18 which are secured on concrete bases 19 on each side of a plate 1. The center of the radius of these sectors corresponds to the axle 2 of platform 1. The platform includes guide members 20 secured to the outer sides of the frame 1. The rear ends of the beams 4 are provided with rollers 21 rotatably mounted on shafts 22. These rollers are elevated with respect to the floor of the platform and with regard to the rollers 7 as shown in Fig. 1.

The operation of this tilting platform is as follows:

Assuming that the unloading of a truck A is desired, the truck is backed on the plates 1 with the wheels of said truck resting on each of them between the guides 20 until the rear wheels of said truck tangentially rest against the loose rollers 21 which serve as bumpers and position the truck wheels on the rollers 7. In this position, by shifting the gears of the truck to reverse, the traction or the rear wheels of the truck frictionally drive the rollers 7 causing the same to rotate. The system of gears formed by the pinion 8 and the gear 9, the pinion 13 and the gear 14 rotate the pinions 17 with respect to the toothed sectors 18 which acting as racks will cause the tilting of plates 1 as well as of truck A, as shown by dotted line of Fig. 1 and the load carried by the truck slides rearwardly therefrom.

The plates 1 and truck A will return to their horizontal position by shifting the truck gears to first speed, by the reversed movement of the aforesaid gears.

I claim:

1. Apparatus for tilting a power driven truck to an unloading position comprising, a rigid frame, means pivotally supporting said frame, rollers rotatably mounted on the frame adjacent the rear end thereof, a shaft extending transversely of the frame, a fixed sector having gear teeth arranged thereon concentric with the axis of said pivoting means, a pinion secured to said shaft meshing with the gear teeth of said sector, a driving connection between said rollers and said shaft, stop members carried by the rear end of the frame above the surface thereof for preventing rear wheels of the truck from passing beyond the rear end of the frame and for positioning the rear wheels of the truck over said rollers whereby said pinion is driven by the truck wheels rotating the rollers to pivot the frame and raise the front end thereof.

2. Apparatus for tilting a power driven truck to an unloading position comprising, a rigid frame, pivots supporting the frame adjacent the rear end thereof, rollers rotatably mounted on the frame adjacent the rear end thereof, a fixed sector arranged on each side of the frame forwardly of said pivots, gear teeth on said sectors arranged along arcs concentric with the axis of said pivots, a pinion meshing with the gear teeth of each sector rotatably mounted on the frame, means providing a driving connection between the rollers and said pinions, rotatable stop members carried by the rear end of the frame above the surface thereof for positioning rear wheels of the truck on said rollers whereby the rollers are driven by the rear wheels of the truck to rotate said pinions and pivot said frame to raise the front end thereof.

3. Apparatus for tilting a power driven truck to an unloading position comprising, two spaced plates for receiving the wheels of a truck to be unloaded, means connecting said plates to provide a rigid frame, pivots intermediate the mid point of the frame and a discharge end thereof for pivotally supporting said plates, rollers rotatably mounted on said frame adapted to be engaged by driven wheels of a truck to be unloaded, a fixed gear sector arranged on each side of the frame, said gear sectors having gear teeth thereon arranged concentric with the axis of said pivots, pinions rotatably mounted on the frame engaging the gear teeth of said sectors, and means providing a driving connection between the pinions and said rollers whereby the discharge end of the frame may swing downwardly on said pivots upon rotation of the pinions.

4. Apparatus for tilting a power driven truck to an unloading position comprising, spaced plates for receiving all wheels of the truck to be unloaded, means connecting said plates providing a rigid frame, pivots supporting said frame, a transverse shaft rotatably mounted on the frame, rollers secured to said shaft adapted to be engaged and driven by driving wheels of the truck, a fixed gear sector arranged on each side of the frame, gear teeth carried by said sectors along arcs concentric with the axis of said pivots, a second transverse shaft rotatably mounted on the frame, pinions secured to the second shaft meshing with the gear teeth of said sectors, and means intermediate said plates providing a driving connection between the first and second shafts.

5. Apparatus for tilting a power driven truck to an unloading position comprising, a rigid frame having supporting surfaces for receiving all wheels of the truck to be unloaded, pivots supporting said frame, a transverse shaft rotatably mounted on said frame, rollers secured to said shaft adapted to be engaged and driven by driving wheels of the truck on the frame, means maintaining the driving wheels of the truck in engagement with said rollers, a fixed gear sector arranged laterally of the frame with the gear teeth thereof concentric with the axis of said pivot, a pinion carried by the frame engaging the gear teeth of said sector, and means providing a driving connection between said shaft and said pinion.

MANUEL CASTILLA Y RUIZ.